United States Patent [19]

Myers

[11] 3,905,626

[45] Sept. 16, 1975

[54] WINDSHIELD STORAGE LATCH

[75] Inventor: Kenneth R. Myers, Aurora, Ill.

[73] Assignee: Caterpiller Tractor Company, Peoria, Ill.

[22] Filed: Dec. 26, 1973

[21] Appl. No.: 428,391

[52] U.S. Cl. ............. 292/216; 292/78; 292/DIG. 4; 292/DIG. 36
[51] Int. Cl.² .......................................... E05C 3/26
[58] Field of Search . 292/78, 216, DIG. 36, DIG. 4, 292/DIG. 46, DIG. 47, DIG. 49; 49/197–205

[56] References Cited
UNITED STATES PATENTS

| | | |
|---|---|---|
| 370,697 | 9/1887 | Hannay............................. 49/197 X |
| 2,554,442 | 5/1951 | Ehret.................................... 292/78 |

FOREIGN PATENTS OR APPLICATIONS

| | | |
|---|---|---|
| 989,554 | 5/1951 | France................................. 49/197 |
| 436,613 | 11/1926 | Germany .............................. 292/78 |

Primary Examiner—Richard E. Moore
Attorney, Agent, or Firm—Phillips, Moore, Weissenberger, Lempio & Strabala

[57] ABSTRACT

A vehicle has an operator's cab mounted thereon with a windshield mounted on the cab for upward movement from a closed position to an open position. A pair of latches are pivotally mounted on the cab to permit such upward movement of the windshield and to automatically pivot to a blocking disposition beneath the windshield to prevent inadvertent downward movement thereof.

10 Claims, 5 Drawing Figures

WINDSHIELD STORAGE LATCH

BACKGROUND OF THE INVENTION

The operator's cab of an earthworking vehicle, such as an excavator, normally has several openable windshields mounted thereon. One or more of the windshields may be opened to facilitate circulation of air in the cab, to facilitate serviceability of certain components and/or to increase the operator's visibility during certain phases of excavator operation. For example, during a trenching operation in close quarters the operator oftentime opens a windshield to visually inspect the ground areas closely adjacent to the excavator.

Many such windshields are provided with conventional latch mechanisms to hold the windshield in its open position. However, such latch mechanisms are normally prone to inadvertent release of the windshield due to extreme vibrations generated during excavator operation.

SUMMARY OF THIS INVENTION

An object of this invention is to provide an economical and non-complex releasable latch means adapted to positively hold the windshield of a vehicle's operator's cab in an open position. The windshield is movably mounted on the cab for upward movement from a closed position to an open position. The releasable latch means is pivotally mounted on a cab for permitting the windshield to move thereby upon engagement therewith when the windshield is moved upwardly to its open position and for thereafter automatically pivoting to a positive blocking disposition beneath the windshield upon engagement therewith to prevent inadvertent downward movement of the windshield. The latch means may be released manually to permit the windshield to be lowered again by the operator.

BRIEF DESCRIPTION OF THE DRAWINGS

Other objects of this invention will become apparent from the following description and accompanying drawings wherein.

DETAILED DESCRIPTION

Figure 1:
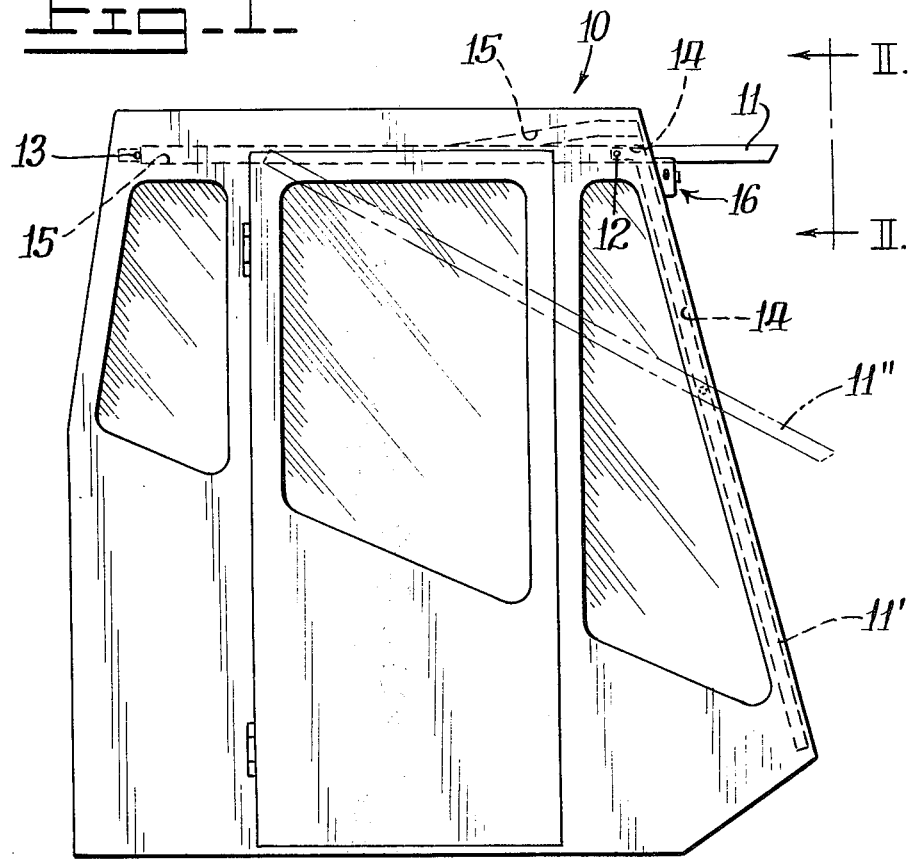
FIG. 1 is a side elevational view of an operator's cab for a vehicle having a windshield movably mounted thereon.

FIG. 1 illustrates an operator's cab 10 for an earthworking vehicle, such as an excavator. The cab comprises a windshield 11 shown in its generally horizontally disposed open position by solid lines. The windshield normally assumes a generally vertically disposed closed position 11' and may be moved upwardly to its open position through a transitory intermediate position 11''.

Figure 2:
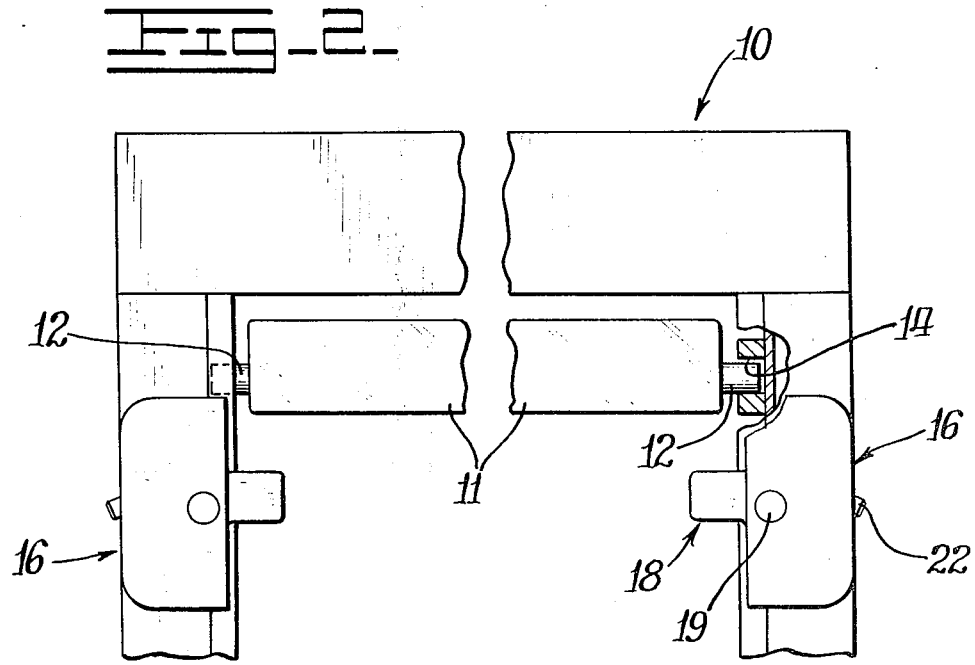
FIG. 2 is an enlarged, partial front elevational view, taken in the direction of arrows II—II in FIG. 1, showing the windshield in its open position and retained thereat by a pair of latch means.

A pair of guide pins 12 and 13 are secured on each lateral side of the windshield to engage guide tracks 14 and 15, respectively (FIG. 2). A pair of releasable latch means 16 are mounted on the upper end of the cab, adjacent to the lateral sides of the windshield, for permitting the windshield to move thereby upon engagement therewith when the windshield is moved upwardly to its open position. Thereafter, the two latch means function in like but reverse manners to automatically pivot to positive blocking dispositions beneath the windshield upon disengagement therewith to prevent downward movement of the windshield from its open position.

Figure 3:
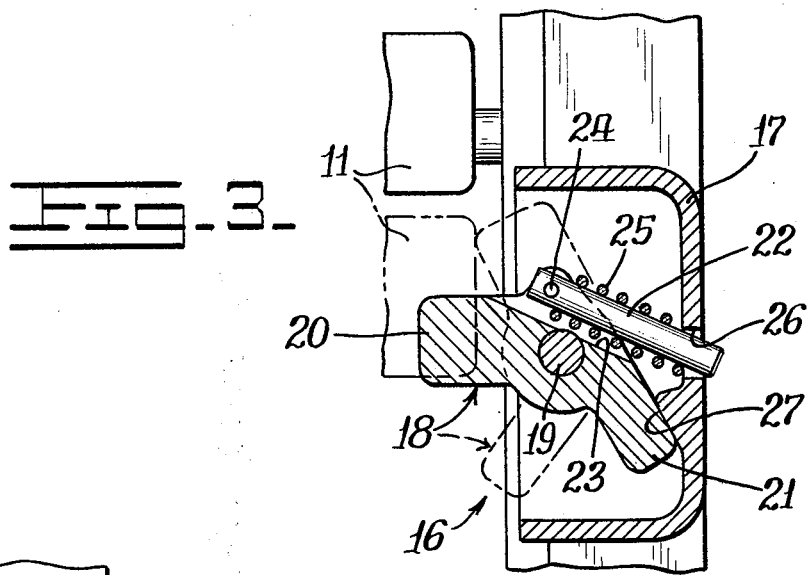
FIGS. 3-5 are enlarged sectional views disclosing a latch means in various modes of operation.
Figure 4:
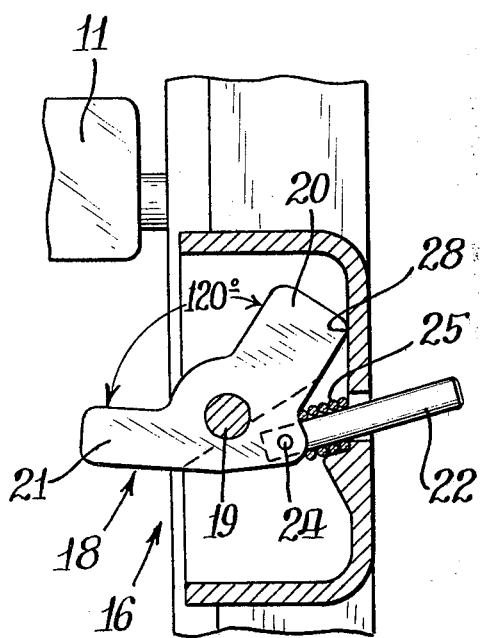
Figure 5:
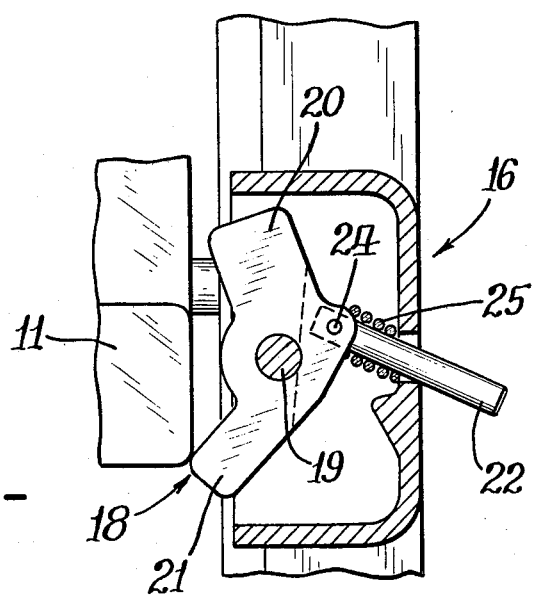

FIGS. 3-5 illustrate such sequence of operation and a subsequent windshield release function. Each latch means comprises a housing 17 having a latch member 18 pivotally mounted therein by a first pivot means or pin 19. The latch member is generally L-shaped to comprise a first or blocking leg 20 and a second or release leg 21. As shown in FIG. 4, the legs preferably form an obtuse angle therebetween approximately 120°. A pin 22 is pivotally mounted in a cut-out portion 23 of the latch member by a second pivot means or pin 24.

A compression coil spring 25 is mounted on pin 22, between pin 24 and the housing. The spring functions to alternately pivot leg 20 and statically hold leg 21 of the latch member in the path of movement of the windshield. An aperture 26 is formed through the housing to accommodate reciprocal movements of the pin therethrough. First and second stop means 27 and 28 are formed internally on the housing to alternately engage legs 21 and 20 of the latch member, as shown in FIGS. 3 and 4.

In operation, upward movement of windshield 11 from its closed position (11') towards its open position illustrated in FIG. 1 will function to pivot latch member 18 of FIG. 3 to its illustrated phantom line position. Upon further movement of the windshield therepast, the latch member will pivot counterclockwise (clockwise for the other latch member) to its solid line position in FIG. 3 under the biasing force of spring 25. Thus, leg 21 of the latch member will engage stop 27 and dispose leg 20 in a positive blocking position beneath the windshield to prevent retrograde movement thereof.

When the operator desires to close the windshield, he initially snaps latch member 18 to its FIG. 4 overcenter position. In such position leg 20 engages stop means 28 to dispose leg 21 in the path of movement of the windshield. It should be noted that spring 25 functions to bias the latch member clockwise about pivot pin 19 due to the overcenter disposition of pin 24 relative to pin 19.

Downward movement of the windshield will thus engage release leg 21 of the latch member to pivot it counterclockwise to its FIG. 5 position whereby the windshield may be moved fully downwardly to its closed position 11', illustrated in FIG. 1. Once downward movement of the windshield causes pin 24 to rotate past line of centers of pin 19 and aperture 26, latch member 18 will automatically pivot counterclockwise to its FIG. 3 solid line position under the biasing force of spring 25 whereby leg 21 again engages stop means 27 to dispose leg 20 in the path of movement of the windshield.

I claim:

1. In an operator's cab for a vehicle having a windshield movably mounted thereon for guided upward movement from a closed position to an open position, the invention comprising at least one releasable latch means, pivotally mounted on said cab by first pivot means, for permitting said windshield to move thereby upon engagement therewith when said windshield is moved upwardly to its open position and for thereafter automatically pivoting to a positive blocking disposition beneath said windshield upon disengagement therewith to prevent downward movement of said windshield from such open position, said latch means comprising a generally L-shaped latch member pivotally mounted on said cab, said latch member comprising first and second legs each pivotal into the path of movement of said windshield and a first stop means for engaging said second leg when said latch member pivots to dispose said first leg into the path of movement of said windshield.

2. The invention of claim 1 wherein said legs form an obtuse angle therebetween.

3. The invention of claim 2 wherein said obtuse angle approximates 120°.

4. The invention of claim 1 wherein said latch means further comprises a second stop means for engaging said first leg when said latch member pivots to dispose said second leg into the path of movement of said window.

5. The invention of claim 1 wherein said latch means further comprises a housing secured to said cab, said latch member pivotally mounted in said housing and said first and second stop means formed internally in said housing.

6. The invention of claim 2 wherein said latch means further comprises spring means for alternately pivoting and statically holding first and second legs of said latch member in the path of movement of said windshield.

7. The invention of claim 6 wherein said latch means further comprises a pin pivotally mounted on said latch member, by second pivot means, said spring means mounted on said pin to engage said second pivot means.

8. The invention of claim 7 wherein said second pivot means is positioned on said latch member to be urged in a first rotational direction by said spring means to position said first leg into the path of movement of said windshield and to be urged in a second opposite rotational direction manually and thus statically held by said spring means to place said second pivot means into overcenter relationship with respect to said first pivot means to place said second leg into the path of movement of said windshield.

9. The invention of claim 7 wherein said latch means further comprises a housing secured to said cab and means forming an aperture through said housing, said pin slidably mounted in said aperture and said spring means comprising a compression coil spring mounted between said second pivot means and said housing.

10. The invention of claim 1 wherein a pair of said latch means are pivotally mounted on an upper end of said cab, adjacent to lateral sides of said windshield.

* * * * *